(12) United States Patent
Clayton-Luce (10) Patent No.: US 8,006,059 B1
(45) Date of Patent: Aug. 23, 2011

(54) METHOD AND PROCEDURE FOR CREATING END TO END STORAGE FROM CONTROLLER TO HOST

(75) Inventor: Timothy Clayton-Luce, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 838 days.

(21) Appl. No.: 12/034,621

(22) Filed: Feb. 20, 2008

(51) Int. Cl.
*G06F 12/00* (2006.01)

(52) U.S. Cl. .................. 711/170; 711/161; 709/226

(58) Field of Classification Search .............. 711/161, 711/170; 709/226
See application file for complete search history.

(56) References Cited

U.S. PATENT DOCUMENTS

| | | | |
|---|---|---|---|
| 2005/0210098 A1* | 9/2005 | Nakamichi et al. | 709/203 |
| 2007/0112974 A1* | 5/2007 | Shirogane et al. | 709/239 |
| 2007/0168470 A1* | 7/2007 | Nonaka et al. | 709/219 |

* cited by examiner

*Primary Examiner* — Jared Rutz
(74) *Attorney, Agent, or Firm* — Perkins Coie LLP (57) ABSTRACT

A system and method to facilitate the process of creating end to end storage from a network storage controller to one or more hosts is described. A storage controller management engine provides the network storage controller with configuration information, provisions storage on the network storage controller as one or more logical units, and maps a host to the one or more logical units, to create end to end storage from the network storage controller to the host in a highly automated and user-friendly manner.

23 Claims, 7 Drawing Sheets

METHOD AND PROCEDURE FOR CREATING END TO END STORAGE FROM CONTROLLER TO HOST

BACKGROUND

A network storage controller is a system device which controls storage and retrieval of data. An example of a network storage controller is a storage server, which is a processing system that stores and retrieves data on behalf of one of more clients on a network. A network storage controller sometimes manages data in a group of non-volatile mass storage devices such as magnetic or optical disks. Such mass storage devices may be organized into groups of drives, such as into a redundant array of independent disks (RAID). A network storage controller typically includes memory for buffering data to be read from and written to and from the mass storage system. Typical network storage controllers implement the buffer as dynamic random access memory (DRAM).

The non-volatile mass storage devices may be aggregated and divided into volumes including logical units, each identified by a logical unit number (LUN). One or more hosts (e.g., clients) may access the logical units via a network, such as by mapping to the logical units and reading from and writing to the LUNs as virtual mass storage devices. Data may be stored to and retrieved from the logical units by the hosts as though the LUNs were locally attached to the hosts as mass storage devices.

A new network storage controller or a network storage controller otherwise requiring preparation for use requires various parameters and configuration information to be supplied in order for the network storage controller to be used with one or more hosts. Such parameters and information can be numerous and present a challenging obstacle for a network administrator or other user to set up the network storage controller. Further, the speed at which a network storage controller may be prepared for use may be limited by the extensive amount of human interaction required to prepare the network storage controller for use.

A network administrator having modest knowledge or even advanced knowledge of processing systems may be daunted by the setup procedures required to use a network storage controller, especially one desired for use in large-scale networks. Such an administrator may be confronted with a command line interface requiring memorization of parameters and commands for setup. Even a more sophisticated user interface may still require a user to precisely identify numerous parameters such as an address for use by the network storage controller. A successful administrator providing configuration information then is confronted with the task of preparing storage for use by a host (i.e., "provisioning").

DETAILED DESCRIPTION

To overcome the problems discussed above, the techniques introduced here include a setup "wizard" which guides an administrator through the details of a setup process for preparing a network storage controller to create a session with a host for storing and retrieving files using storage managed by the network storage controller. The setup process occurs in a user-friendly and highly automated manner. Operations performed by the "wizard" include configuring the network storage controller using information retrieved from a user interface, provisioning storage for use as one or more logical units, and mapping a host to the network storage controller. Such operations were previously performed at multiple computing devices using the complicated software applications and/or command line interfaces discussed above. The wizard substantially reduces the amount of user interaction required to perform these operations. The powerful "wizard" centralizes the work of an administrator into a single computing device obviating the need for the various complicated software operations. The wizard provides an efficient and simple mechanism (from a user's perspective) of setting up end to end storage from a host to a storage controller.

In some embodiments, the setup wizard is embodied as software, which can be executed by a processing device that includes a processor and a memory. In combination, such a processing device is termed a controller management engine. Instructions stored in memory prepare a network storage controller for use, when executed, by collecting configuration information from a user, delivering the configuration information to the network storage controller, provisioning storage at the network storage controller in accordance with requirements specified by the user, and mapping or "gluing" the provisioned storage to hosts identified by the user. "Provisioning storage" refers to defining one or more logical units of storage from one or more physical data storage devices; for example, "provisioning" can include combining one or more mass storage devices into an aggregate, defining one or more volumes within the aggregate and defining LUNs (logical unit numbers) within the volumes.

Advantageously, a user or administrator setting up a new network storage controller may quickly and easily prepare the network storage controller for use. Information is gathered by the controller management engine and transmitted to the network storage controller on behalf of the administrator, simplifying the task of preparing the network storage controller for use. In some embodiments, the controller management engine asks the user for the size LUNs to be created, and then automatically creates an aggregate and one or more volumes from the mass storage devices attached to the network storage controller. The user is shielded from technical details for creation of the aggregate and the volumes thereby simplifying the task of preparing storage for use.

The software that embodies the setup wizard can be, for example, application level software that executes on top of a conventional operating system. It can be a self-contained application or a component of a larger application, such as an application which provides various network storage management functions.

The controller management engine can directly or remotely configure a network storage controller. The controller management engine can be used from a wide variety of locations, including locations remote to the network storage controller. As used herein, "remote" defines a relationship between a first processing device and a second processing device wherein the first processing device and the second processing device may communicate by one or more networks, but not by a direct connection. "Remote" need not indicate a physical reference to space; a first processing device in the same physical room with a second processing device may be "remote" to the second processing device as defined above.

As used herein, "system" includes either an individual computing device, or more than one computing device. Where a system includes more than one computing device, such as in a cluster, the computing devices can be networked together, directly connected, or connected in any known or convenient manner. Advantageously, an inexperienced or even moderately experienced user is shielded from the technical details of preparing the network storage controller for use. The controller management engine may be used from a wide variety of locations, and individual undertaking to prepare the network storage controller for use experience fewer difficulties resulting in increased productivity.

As used herein, "provisioning" includes preparing one or more mass storage devices attached to a network storage controller for use by the network storage controller. Provisioning extends to logical use of the mass storage devices such as in an aggregate, one or more volumes included in the aggregate and one or more LUNs included in the one or more volumes.

Figure 1:
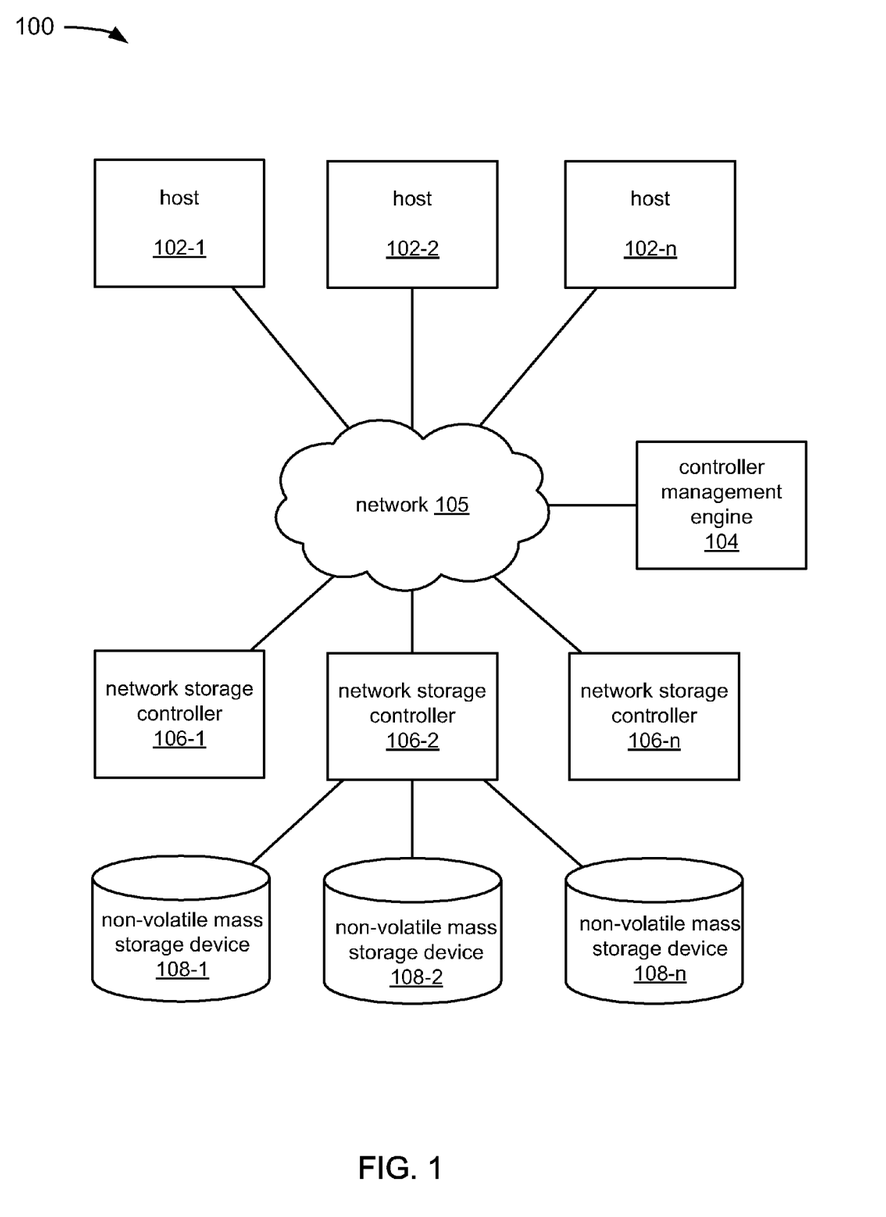
FIG. 1 depicts an example of a network storage system.

FIG. 1 depicts an example of a network storage system. In the example of FIG. 1, the system 100 includes host 102-1, host 102-2, host 102-n (collectively hosts 102) controller management engine 104, network storage controller 106-1, network storage controller 106-2, network storage controller 106-n (collectively network storage controllers 106). The network storage controllers 106 are coupled to controller management engine 104 and to hosts 102 by network 105 as defined below. Non-volatile mass storage devices 108-1 through 108-n (collectively non-volatile mass storage devices 108) are coupled to the network storage controller 106-2.

The hosts 102 can be any processing system or combination of processing systems including the ability to use network storage. Such systems can reside in one or more hardware units and such units maybe connected by one or more networks. Software enabling the processing system to use network storage may include iSCSI (internet/initiator Small Computer System Interface) software. Software implementing iSCSI enables a connection between the host and a network processing device. Where iSCSI is used, a license may be required, and the technique introduced here can include a step to check for the license.

The controller management engine 104 is a system or device to receive user instructions and take action in response to the instructions to create an end to end connection between a host and a network storage controller. An "engine" may include a processor and memory. In the engine the memory includes one or more computer readable media. The memory is coupled to the processor and stores instructions, and the processor executes the instructions to provide functionality of the engine.

The network 105 may be a local area network (LAN), wide area network (WAN), metropolitan area network (MAN), global area network such as the Internet, a Fibre Channel fabric, any combination of such networks, or any other known or convenient medium for communicating data. The network 105 can include one or more routers, switches and/or other networking hardware elements coupled together to provide communications to systems or within systems and devices coupled to the network 105.

The network storage controllers 106 each include a storage operating system that includes a storage manager to logically organize data. In some embodiments the storage manager implements a hierarchical structure of directories and files on one or more logical units. Data stored by a network storage controller 106 can be stored in basic units of data called blocks. Files can be defined from multiple blocks, as can larger units of storage such as volumes, etc.

The network storage controllers 106 each implement various features and functions associated with storage, retrieval, and backup of data. The network storage controllers 106 each may implement one or more network storage protocol such as iSCSI, FCP (Fibre Channel Protocol), NFS (Network File System), SMB/CIFS (Server Message Block/Common Internet File System). Each of the network storage controllers 106 manages data in a group of mass storage devices such as magnetic or optical disks. Each of the network storage controllers 106 typically includes memory, such as dynamic random access memory (DRAM) for buffering data to be read and written to the mass storage system.

The non-volatile mass storage devices 108 may be hard disk drives, such as magnetic hard disks, optical disks, flash memory, or another form of storage for persistently storing large amounts of data. In the context of the network storage controller 106-2, one or more non-volatile mass storage devices 108 may be used to define an aggregate. At least a portion of the aggregate may be separately defined as logical volumes within the aggregate. The volumes may each be divided into one or more LUNs. The mass storage devices may be organized into groups of drives, such as into one or more RAID groups.

In the example of FIG. 1, in operation, the controller management engine 104 discovers a network storage controller 106-2 which is either new or otherwise requires setup, e.g. has suffered catastrophic hardware failure and needs a new setup. To discover the network storage controller, the controller management engine 104 first scans the network 105 for all storage controllers and then identifies those network storage controllers requiring setup. One way of identifying a network storage requiring setup is to find those devices that do not have an active storage partition, e.g. a particular volume, designated "vol1," the absence of which indicates that storage has not been provisioned on the network storage controller. Once the list of storage controllers on the network has been filtered to identify network storage controllers requiring setup, the controller management engine can display to a user a list of network storage controllers, including the network storage controller 106-2 requiring setup. This may be displayed through an appropriate graphical user interface (GUI), such as the setup wizard mentioned above. A user using the controller management engine (e.g., a network administrator) then selects the network storage controller 106-2 to receive setup.

The controller management engine 104 performs a setup of the selected network storage controller 106-2 by requesting information from the user (e.g., as part of the setup wizard) and then transmitting the information to the network storage controller 106-2 for use. The controller management engine 104 requests configuration information from the user and receives the configuration information at the controller management engine 104. The controller management engine 104 transmits the configuration information to the network storage controller 106-2 for use in initiating storage services. The configuration information is aggregated by the controller management engine 104 into one or more commands which it transmits to the network storage controller, advantageously shielding the user from having to remember and manually input those commands and information. The network storage controller 106-2 uses the configuration information to initiate services at the network storage controller 106-2.

The configuration information may include, for example, a user recognizable name for the network storage controller 106-2, an IP (internet protocol) address for the network storage controller to use to communicate with systems and devices on the network 105, an address for a mail server for the network storage controller to use to communicate with other devices and individuals via email, an address of a domain name server (DNS), windows internet name server (WINS), and/or any other information convenient or necessary for a network storage controller to communicate with other devices and systems or to perform desired tasks. At times, the controller management engine 104 identifies configuration information automatically, such as in scanning the network for a partner controller, as discussed in reference to FIG. 6.

The controller management engine 104 can instruct the network storage server 106-2 to provision storage at the network storage controller 106-2 according to the user's specifications, including creating an aggregate of one or more mass storage devices 108 attached to the network storage controller 106-2, creating one or more volumes within the aggregate and provisioning one or more LUNs within any given volume.

The controller management engine 104 also discovers the hosts 102 on the network 105, including the host 102-1. For example, assume the host 102-1 requires data storage services. To discover the hosts, the controller management engine 104 scans the network 105 for hosts and displays a list of hosts to the user (e.g., as part of the setup wizard). The user then specifies one or more LUNs to attach to the host. The user selects the host 102-1 to indicate that the controller management engine 104 should attach storage from the network storage controller 106-2 to the host 102-1. In response to the user's selection, the controller management engine 104 instructs the network storage controller 106-2 to map storage to the host 102-1, including associating the specified LUN with the host for use as storage. The controller management engine creates a session, e.g. an iSCSI session, between the network storage controller 106-2 and the host 102-1 to allow for use of the storage by the host 102-1. At the host 102-1, the LUNs will appear to the host. Where a Windows® host is used, Windows Management Interface (WMI) is used to create the session; plug-n-play functionality causes the LUNs to appear as virtual mass storage devices upon creating the session.

Figure 2:
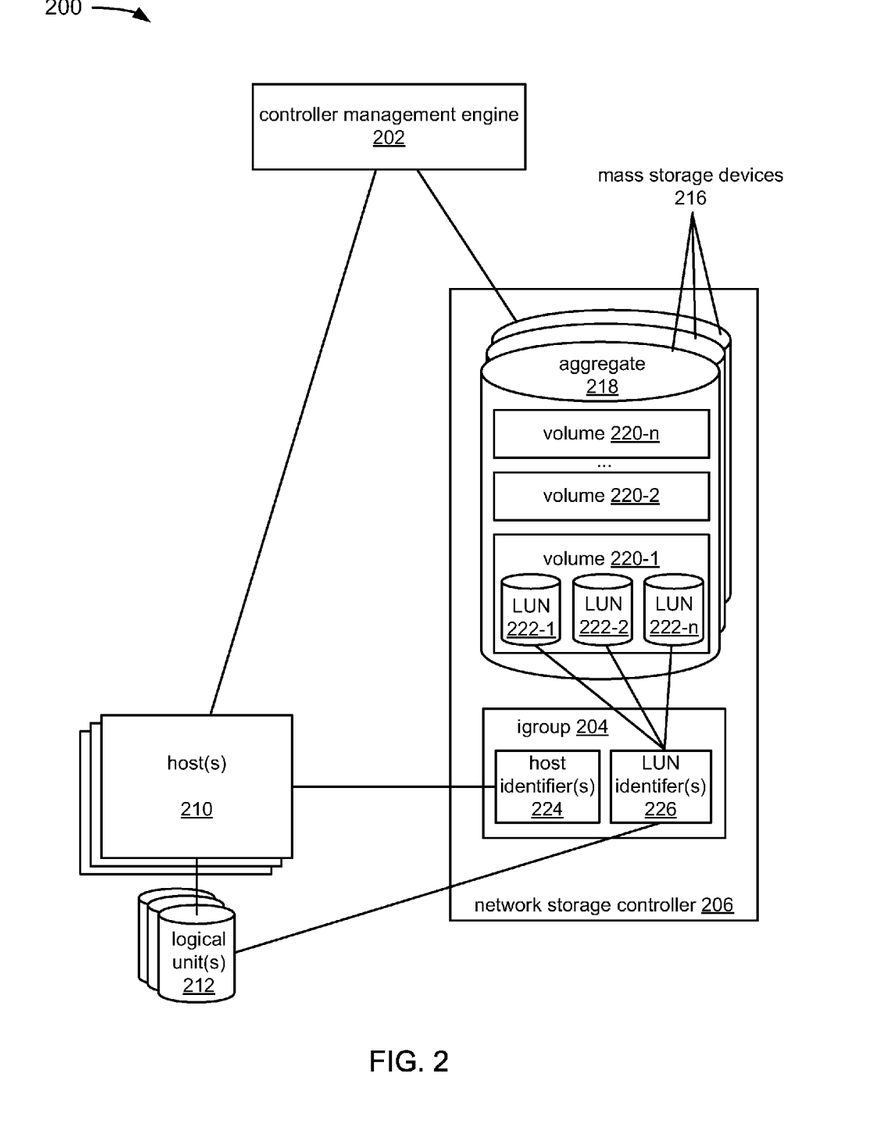
FIG. 2. depicts an example of a system including a controller management engine mapping newly created storage on a network storage controller to a host.

FIG. 2. depicts an example of a system including a controller management engine mapping newly created storage on a network storage controller to a host. FIG. 2 includes a controller management engine 202, and a network storage controller 206. In the example of FIG. 2, the controller management engine 202 may be a controller management engine such as defined in reference to FIG. 1 & the hosts 210 may be hosts as defined in reference to FIG. 1.

The network storage controller 206 includes an igroup 204. An igroup is a data structure including of nodenames of hosts, and the igroup is used to control access to LUNs. The data structure can be a table. The igroup identifies specific hosts that have access to specific LUNs. An igroup can associate a host's IQN (iSCSI Qualified Name, e.g. acquired by the wizard from the host) and LUN to be accessed by the host.

The igroup 204 includes host identifier(s) 224 and LUN identifier(s) 226. The logical units 212 represent virtual mass storage devices at the host(s) 210. The logical units 212 are actually the LUNs included in the volume 220-1 that have been included in the igroup 204. The hosts 210 may be processing devices included in the igroup 204 having permission to use the logical units 212. In the example of FIG. 2, the host(s) 210 are associated to the logical units 212 because the hosts 210 and the logical units 212 are represented by the host identifier(s) 224 and the LUN identifier(s) 226 included in the igroup 204. Hosts 210 associated with the igroup 204 have access to the logical units 212, whereas hosts not included in the igroup 204 do not have access to the logical units 212.

In the example of FIG. 2, network storage controller 206 manages aggregate 218. An aggregate is a set of one or more mass storage devices. Here, volume 220-1, volume 220-2 and volume 220-n (volumes 220) are defined within aggregate 218. A volume is a logical subset of an aggregate; an aggregate typically includes multiple volumes. A volume may be defined to include one or more LUNS. Volume 220-1 includes LUN 222-1, LUN 222-2, and LUN 222-n (collectively LUNs 222). A LUN is a subset of a volume. Typically, LUNs are used as virtual mass storage devices accessible by hosts.

In the example of FIG. 2, in operation, a user enters logical unit specifications to the controller management engine 202 (e.g., through the setup wizard) defining an aggregate, volumes and LUNs. The controller management engine 202 delivers the logical unit specifications to the network storage controller 206. The network storage controller 206 then provisions storage in response to receiving the configuration information. The logical unit specification includes the number and locations of logical units and the size of each unit to be created. In the example of FIG. 2, the storage is provisioned from the aggregate 218 including the volumes 220. The volume 220-1 includes the one or more LUNs 222. Having created the LUNs 222, the controller management engine 202 adds the LUNs 222 and the host(s) 210 to the igroup 204. At the time that the host begins a session with the network storage controller 206, the network storage controller 206 checks the igroup associated with the host(s) 210 using the host identifier(s) 224. The LUN identifiers 226 are associated with the LUNs 222 in the igroup 204. Thus, the network storage controller identifies the host(s) 210 as having access the LUNs 222. The host(s) 210 and the network storage controller 206 then create a session allowing the host(s) 210 access to the LUNs 222.

Figure 3:
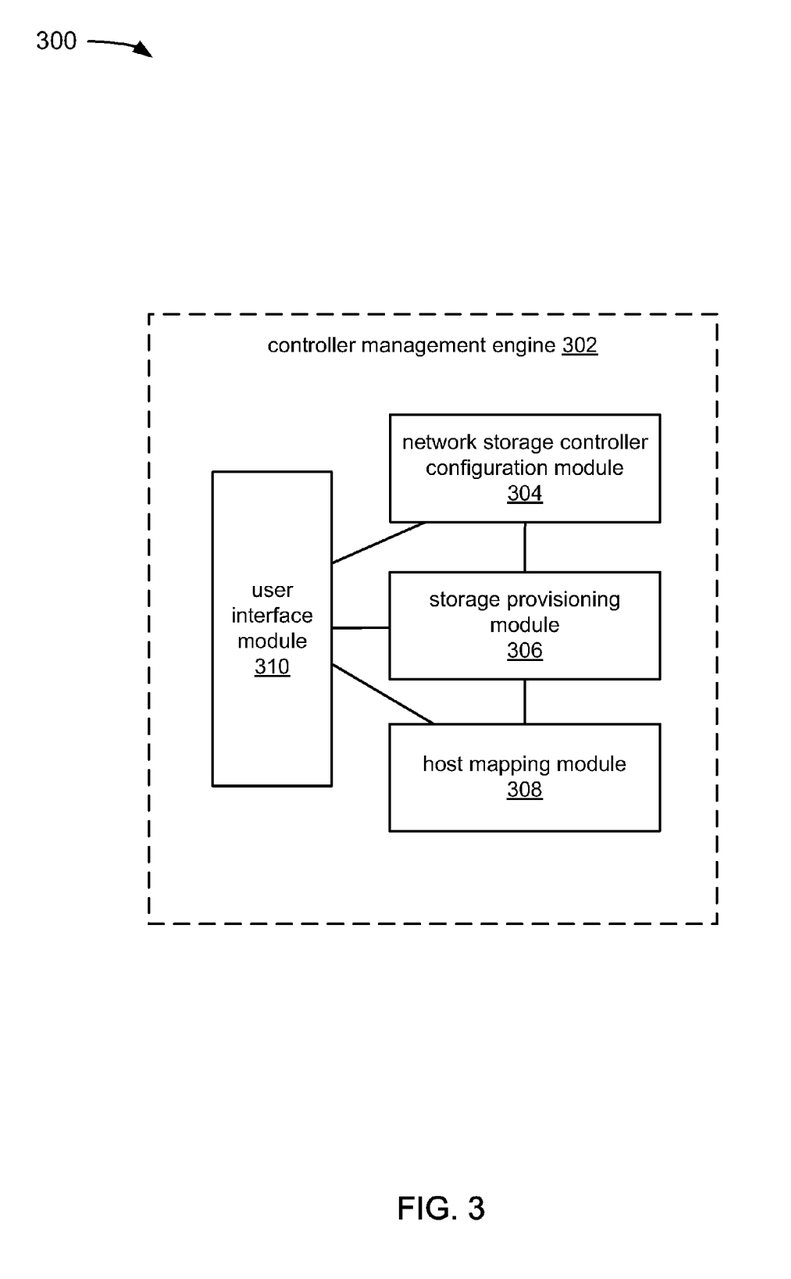
FIG. 3 depicts an example of a controller management engine, including modules executed by the controller management engine.

FIG. 3 depicts an example of a controller management engine such as described above, including modules which perform tasks of the controller management engine. Controller management engine 302 includes network storage controller configuration module 304, storage provisioning module 306, host mapping module 308 and user interface module 310. Any or all of these modules can be implemented in the form of special-purpose hardware, software, firmware, or a combination thereof.

Tasks performed by these modules are discussed in detail below with reference to FIGS. 4 and 5. Stated briefly, in operation the network storage controller configuration module 304 discovers one or more controllers on a network, provides a listing of controllers to the user through the user interface module 310, and receives a user's selection of a controller to which to provide configuration information through the user interface module 310. The storage provisioning module 306 provisions storage in response to receipt of logical unit specifications at the user interface module 310. Storage may be provisioned as one or more logical units. The host mapping module 308 associates the one or more logical units to a host in response to a user's selection of the host at the user interface module 310.

Figure 4:
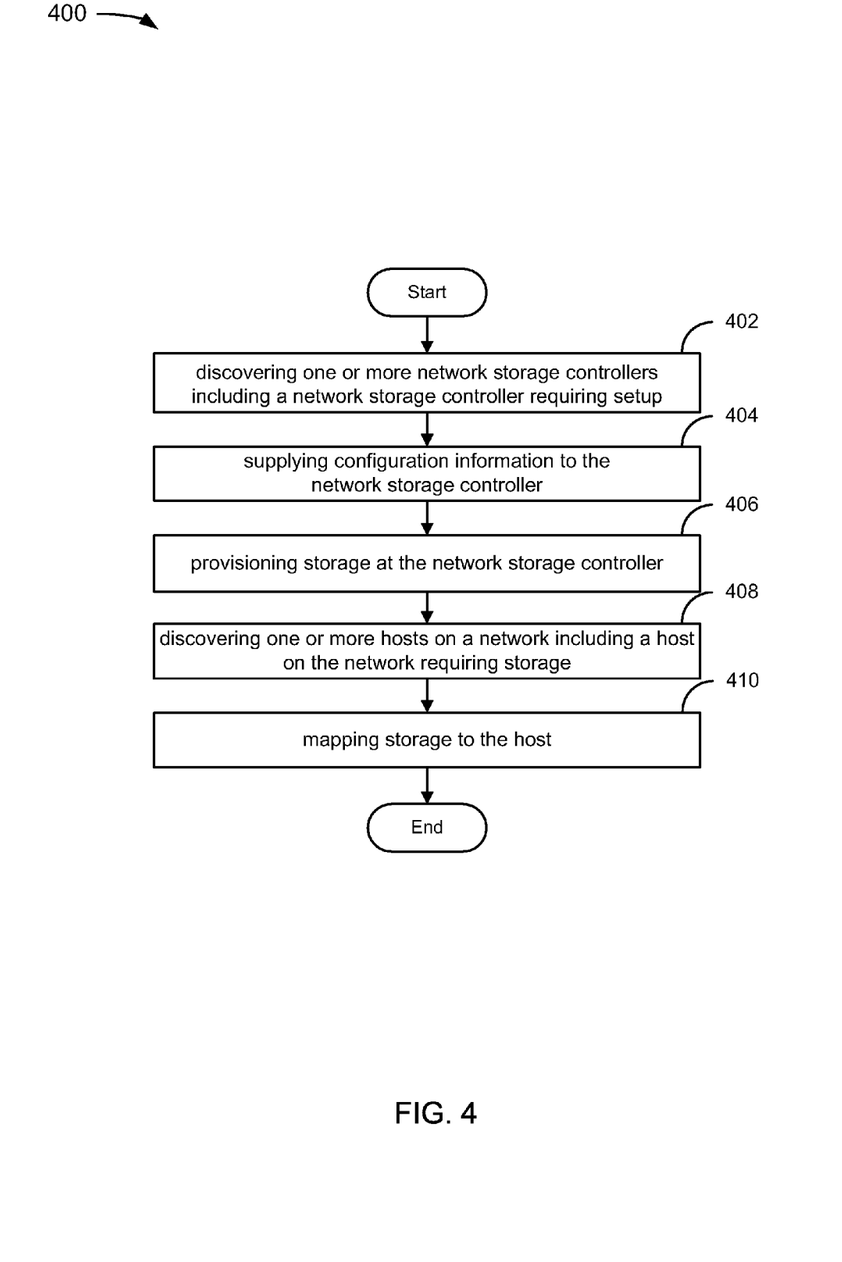
FIG. 4 is a flowchart of an example of a process for creating end to end storage from controller to host.

FIG. 4 depicts an example of a flowchart of a process that may be performed by the controller management engine for creating end to end storage from storage controller to host. The process is organized as a sequence of operations in the flowchart 400. However, it should be understood that at least some of these operations and operations associated with other processes described herein may be reordered in certain instances for parallel execution or into different sequences of operations. A user triggers the process by indicating that a controller management engine should begin to setup a network storage controller, e.g., by activating the setup wizard.

In the example of FIG. 4, the process starts at 402 with discovering one or more network storage controllers including a network storage controller requiring setup. In discovering a controller, the network storage controller configuration module 304 may receive from the user an IP address specifying a particular controller, or the network storage controller configuration module 304 may identify all network storage controllers available to a local network. An IP address range may be specified by the user, in which case the network storage configuration module 304 may scan the IP address range for network storage controllers.

Figure 6:
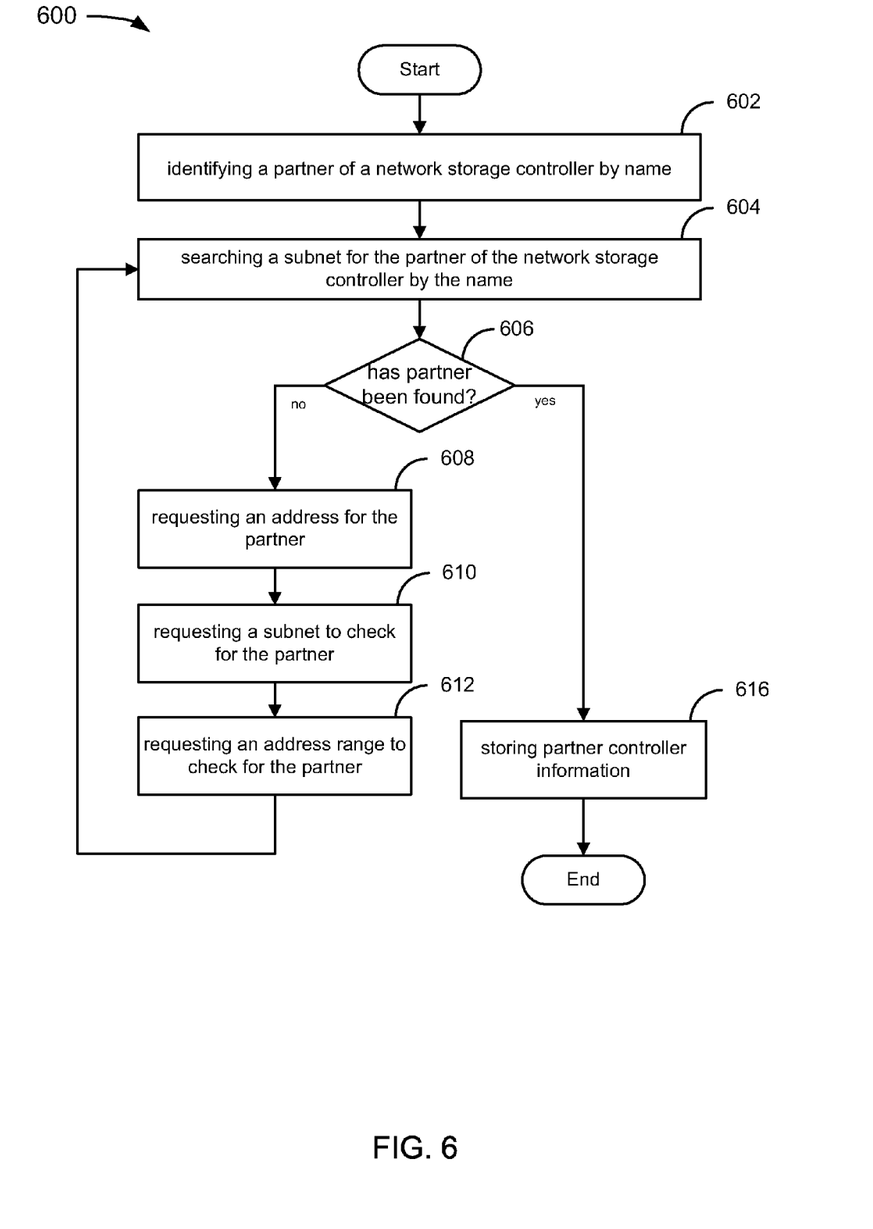
FIG. 6 is a flowchart of an example of a process for identifying a partner of a controller in a storage controller cluster.

Having an initial list of network storage controllers, the network storage controller configuration module 304 then identifies network storage controllers requiring configuration. Any known or convenient manner of identifying network storage controllers requiring configuration may be used. For example, in certain embodiments, the controllers requiring configuration may be identified as those having a volume called "vol0". As used herein, "vol0" refers to a volume that includes essential system data used by a network storage controller to operate. A volume called "vol1", on the other hand, refers to a volume created for the purpose of storing data on behalf of a host. In certain embodiments, the presence of a vol1 indicates that a volume has been created for the purpose of storing data for a host. The presence of a vol1 in a storage controller may thus indicate that the network storage controller has been previously set up.

Where a network storage controller has a partner controller, such as where the network storage controller is a part of a cluster, e.g. for failover purposes, the partner network storage controller may need to be discovered by the controller management engine in order to setup the network storage controller to provision and map storage for the cluster. The discussion below in reference to FIG. 6 provides further details on discovering a partner controller. Having identified a list of network storage controllers requiring configuration, the list may be displayed to the user by the user interface module 310 controller management engine (e.g., as part of the setup wizard). A user then selects a user a network storage controller to supply configuration information to.

In the example of FIG. 4, the process continues to 404 with the controller management engine supplying configuration information to the network storage controller. Where possible, the controller management engine identifies configuration information that it need not ask the user for, such as by searching for a partner network controller as is discussed in reference to FIG. 6. However, if the controller management engine is unable to find the information that it needs, then it may request such information from the user. To acquire other configuration information the controller management engine requests configuration information from the user. Such configuration information may include a name of the storage controller, IP address, a password, support information such as a name and address of a contact in the event of a problem, and a mail host to which to transmit email communication. The user enters configuration information to the user interface module 310 controller management engine (e.g., via the setup wizard). Having acquired the configuration information, the controller management engine transmits the configuration information to the network storage controller as one or more commands. The network storage controller receives the configuration information and enables storage services. A storage operating system in the network storage controller is prepared for storage provisioning.

In the example of FIG. 4, the process continues to 406 with provisioning storage at the network storage controller. The controller management engine prompts a user for information about the manner in which the controller management engine should provision storage at the network storage controller. Such information includes a number and size of one or more LUNs that should be created at the network storage controller. The controller management agent receives the above-mentioned provisioning information via its user interface module 310 (e.g., as part of the setup wizard).

Having received the provisioning information, the controller management engine defines an aggregate to include some or all of the mass storage devices attached to the network storage controller, as specified. The controller management engine then creates one or more volumes within the aggregate. Finally, the controller management engine creates the LUNs specified in the provisioning information. The controller management engine adds LUNs to the volumes until all of the specified LUNs have been added. If the user desires additional space and the one or more volumes are less than the size of the aggregate, one or more volumes may be expanded to allow for the addition of LUNs.

In the example of FIG. 4, the process continues to 408 with discovering one or more hosts on a network, including a host on the network requiring storage. Hosts may be discovered, for example, by searching for hosts within a user-specified IP address range, a particular user-specified IP address, a user-specified IP subnet to search, or by any known or convenient method.

The user specifies a login and password for a host to allow the controller management engine access to the host for the purpose of accessing and instructing the host to attach to storage at the network storage controller. It may be necessary to identify a software agent able to attach to the network storage controller. For example, an iSCSI initiator could be searched for and identified. For a Windows® network, a domain level administrator password may be supplied to grant access to more than one host.

A list of hosts may be displayed to the user by the user interface module 310 of the controller management engine (e.g., as part of the setup wizard) along with storage available by the network storage controller. In response to the user's selection of a host, the controller management engine instructs the network storage controller to attach the storage to the host.

The controller management engine may enable a security protocol to allow the host and the network storage controller to securely communicate. For example, challenge handshake authentication protocol (CHAP) may be used to secure communication between the host and the network storage controller.

In the example of FIG. 4, the process continues to 410 with mapping storage to the host. The controller management engine matches hosts with LUNs such as by placing the LUNs and the hosts in an igroup. By placing both of the LUNs and the host in the igroup the host is allowed to access the LUNs as virtual mass storage devices because hosts are allowed to access LUNs within their igroup. For example, assume the host executes an operating system such as a version of Windows®, as available from Microsoft Corporation of Redmond, Wash. and uses iSCSI protocol to communicate with the network storage controller. The network storage controller may connect to the host using the iSCSI protocol. Using the connection, the host may communicate with the network storage controller directly. Within Windows®, disk management may identify the LUNs as virtual storage devices. Having mapped storage to the host, the process terminates.

Figure 5:
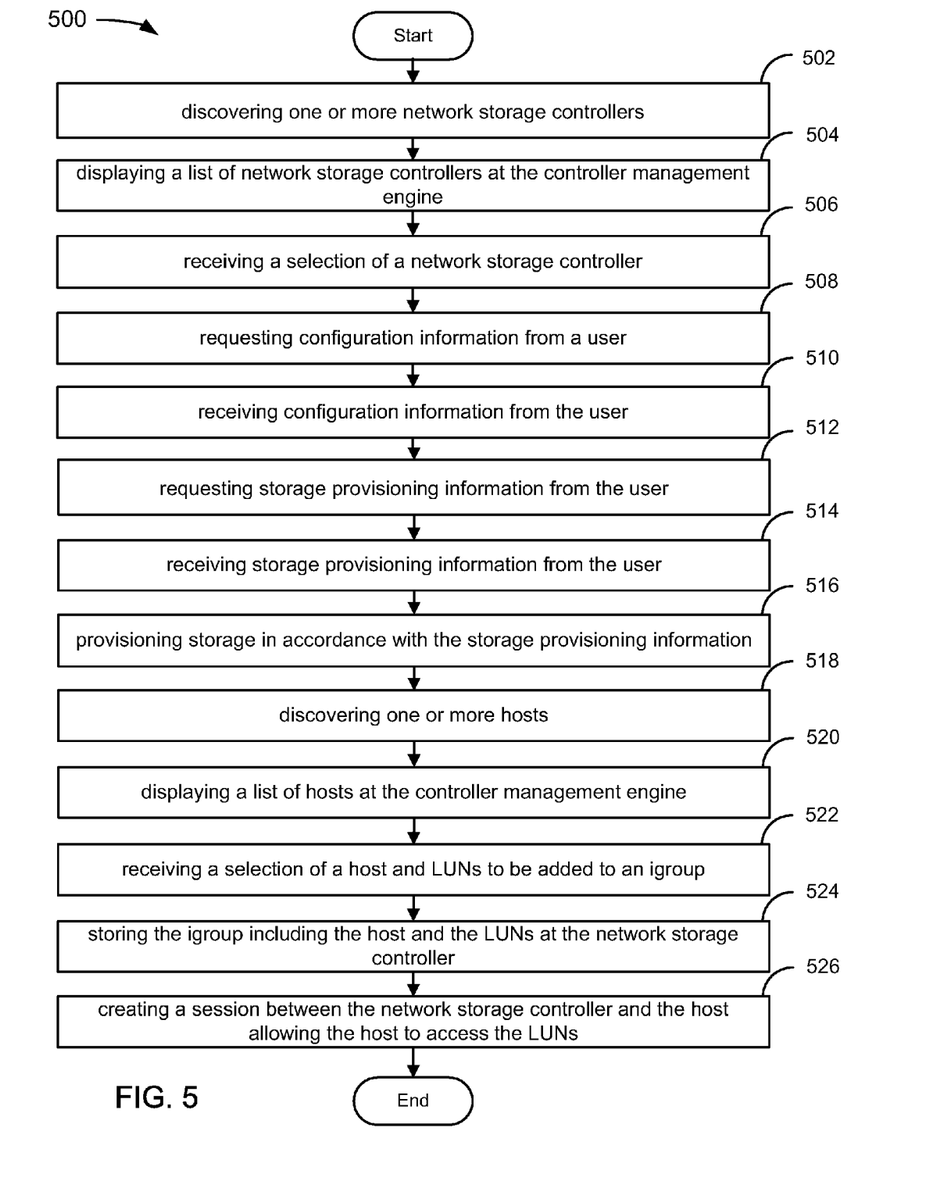
FIG. 5 is a flowchart of an example of a process for preparing a network storage controller for use with a host.

FIG. 5 is a flowchart of an example of a process for preparing a network storage controller for use with a host. The process is organized as a sequence of operations in the flowchart 500. However, it should be understood that at least some of these operations and operations associated with other processes described herein may be reordered in certain instances for parallel execution or into different sequences of operations. A user triggers the process by indicating that a controller management engine should begin to setup a network storage controller, e.g., by activating the setup wizard.

In the example of FIG. 5, the process starts at 502 with discovering one or more network storage controllers. A controller management engine discovers the one or more network storage controllers by searching for network storage controllers on a subnet. The controller management engine can be configured to search only specific ranges of a subnet, and the discovery process can be tailored to identify only certain network storage controllers.

In the example of FIG. 5, the process continues to 504 with displaying a list of network storage controllers at the controller management engine. The list can be displayed to a user so that the user can select a network storage controller to set up. Names, IP addresses, or any other known or convenient information may be displayed in the list.

In the example of FIG. 5, the process continues to 506 with receiving a selection of a network storage controller. The user indicates a selection of the network storage controller that requires setup.

In the example of FIG. 5, the process continues to 508 with requesting configuration information from the user. Such configuration information may include a name of the storage controller, IP address, a password, support information such as a name and address of a contact in the event of a problem, and a mail host to which to transmit email communication. The user enters configuration information to the user interface module 310 controller management engine (e.g., via the setup wizard).

In the example of FIG. 5, the process continues to 510 with receiving configuration information from the user. The user can enter the information directly to the user interface module 310 of the controller management engine, (e.g. via the setup wizard).

In the example of FIG. 5, the process continues to 512 with requesting storage provisioning information from the user. The controller management engine prompts the user for information about the manner in which the controller management engine should provision storage at the network storage controller. In particular the user may define the number of and size of one or more LUNs that should be included in the volumes.

In the example of FIG. 5, the process continues to 514 with receiving storage provisioning information from the user. The controller management engine receives the above-mentioned provisioning information via its user interface module 310 (e.g., as part of the setup wizard).

In the example of FIG. 5, the process continues to 516 with provisioning storage in accordance with the storage provisioning information. The controller management engine defines an aggregate to include some or all of the mass storage devices attached to the network storage controller, as specified. The controller management engine then creates the specified volumes. Finally, the controller management engine creates the LUNs specified by the user.

In the example of FIG. 5, the process continues to 518 with discovering one or more hosts. Hosts may be discovered, for example, by searching for hosts within a user-specified IP address range, a particular user-specified IP address, a user-specified IP subnet to search, or by any known or convenient method.

In the example of FIG. 5, the process continues to 520 with displaying a list of hosts at the controller management engine. The list of hosts includes information to identify the hosts, such as names and IP addresses. Any other known or convenient information can be specified as well.

In the example of FIG. 5, the process continues to 522 with receiving a selection of a host and LUNs to be added to an igroup. The igroup is used to associate the hosts with storage, e.g. LUNs, so that the network storage controller can readily pair a host with storage. For example, when software executing on a host device seeks to use the LUNs at the host as networked storage, the network storage controller may check the igroup associated with the host and find the LUNs for the host.

In the example of FIG. 5, the process continues to 524 with storing the igroup including the host and the LUNs at the network storage controller. The host can be identified by a host identifier, and the network storage controller can be similarly identified using a host identifier. The association of the LUNs and the network storage controller is stored in this relationship.

In the example of FIG. 5, the process continues to 526 with creating a session between the network storage controller and the host allowing the host to access the LUNs. The network storage controller checks the igroup for the host and the LUNs and creates the session using, e.g., iSCSI. Hosts having access to the LUNs can access the LUNs to store and retrieved data once the session is created. Having created a session between the network storage controller and the host, the process terminates.

As mentioned above, in the case of a storage cluster, it may be necessary as part of the setup/configuration process to identify a cluster partner of a storage controller being set up. FIG. 6 depicts an example of a process for identifying a partner of a controller in a storage controller cluster. The process is organized as a sequence of operations in the flowchart 600. However, it should be understood that at least some of these operations and operations associated with other processes described herein may be reordered in certain instances for parallel execution or into different sequences of operations.

The process starts at 602 with the controller management engine identifying a partner of a network storage controller by name. Nominally, a network storage controller stores the name(s) of its partner controller(s) in its local memory or disks. The controller management engine searching for a partner network controller can therefore retrieve the name directly from the network storage controller.

In the example of FIG. 6, the process continues to 604 with the controller management engine searching a subnet for the partner of the controller by the name. The controller management engine can automatically search a subnet of the IP address of the network storage controller for the partner of the network storage controller.

In the example of FIG. 6, the process continues to 606 with the controller management engine determining whether the partner has been found. It is possible for partner controllers to be located on different subnets, and to communicate across different networks. In such a case, additional configuration information may be required such as a range of IP addresses to search or an alternate subnet through which to search.

If the result from decision 606 is "no", then the process continues to 608 with the controller management engine requesting an address for the partner. The controller management engine may determine that a network storage controller has a partner, but where the partner cannot be located, the controller management engine may request additional information from a user to use to find the partner controller. Any manner of requesting such information may be employed, and the following options are examples.

In the example of FIG. 6, the process continues to 610 with the controller management engine requesting a subnet to check for the partner by name. The user enters and receiving user input specifying that. A subnet different from the subnet including the IP address of the network storage controller may be requested. At this operation, it is assumed that the partner controller is located on a different subnet from the network storage controller.

In the example of FIG. 6, the process continues to 612 with the controller management engine requesting the user to specify an address range to check for the partner and receiving user input specifying that. The address range may be a portion of a subnet, or may include multiple portions of multiple subnets. A number of IP addresses may be included to check for the partner network storage controller. In the example of FIG. 6, the flowchart loops back to 604, discussed above.

If the result of decision module 606 is yes, then the process continues to 616 with the controller management engine storing partner controller information. The partner storage controller address has been found, and may be provided to the controller management engine. Having stored partner controller information, the flowchart terminates.

Figure 7:
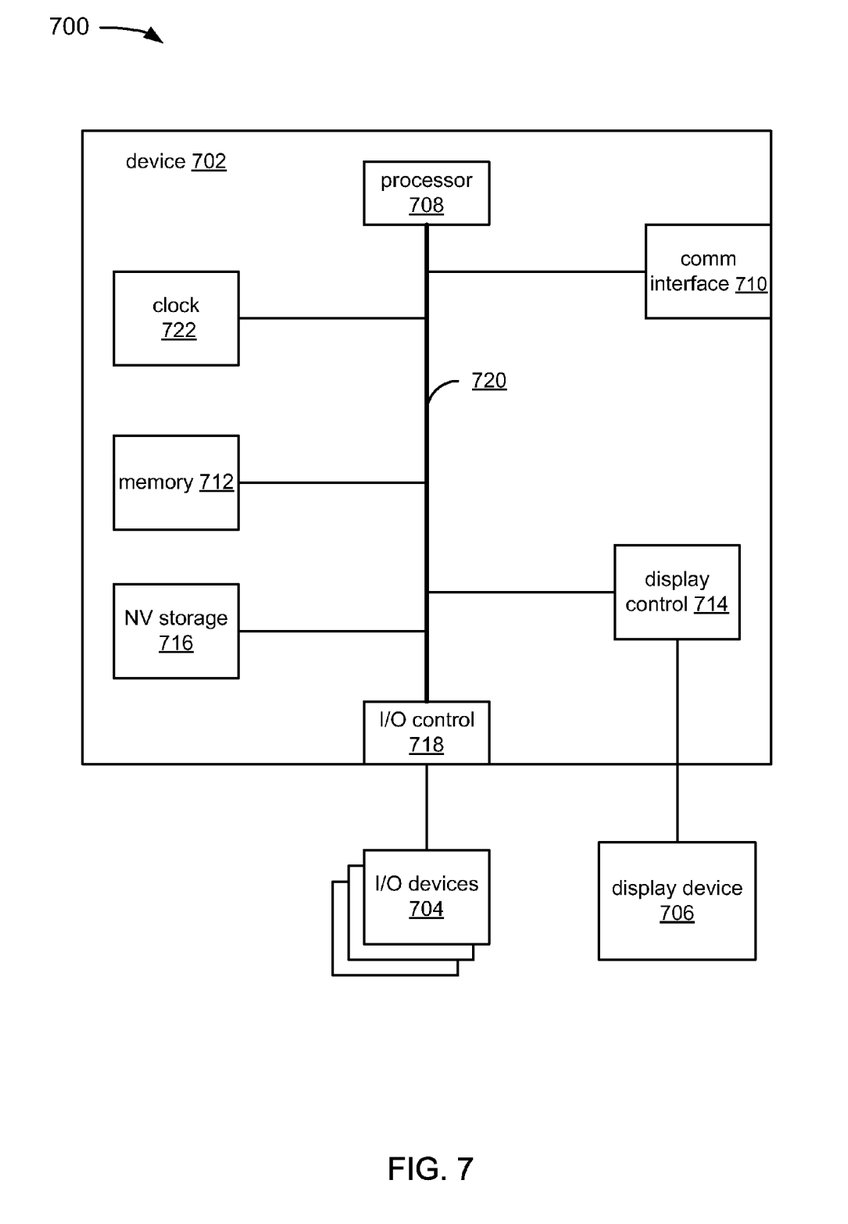
FIG. 7 is a high-level block diagram showing an example of the architecture of a processing system that is representative of any of the processing systems discussed herein, such as a host, storage controller or controller management engine.

FIG. 7 depicts an example of the architecture of a processing system that is representative of any of the processing systems discussed above such as a host, storage controller or controller management engine. The system 700 may be a conventional computer system that can be used as a client computer system, server-class computer system, workstation, or the like.

The illustrated system 700 includes a main subsystem 702, input/output (I/O) devices 704, and a display device 706. The main subsystem 702 includes a processor 708, a communications interface 710, memory 712, display controller 714, non-volatile storage 717, I/O controller 718, clock 722. The device 702 may be coupled to or include the I/O devices 704 and the display device 706. Note that depending on the particular use, not all of these elements will necessarily be present in a particular processing system. For example, a server-class computer (e.g., a storage controller) may not necessarily include any display device or any other I/O capability, other than a network interface. Similarly, any of the processing systems mentioned above can include other devices which are not shown or mentioned here.

The main subsystem 702 interfaces to external systems through the communications interface 710. It will be appreciated that the communications interface 710 can be considered to be part of the system 700 or a part of the main subsystem 702. The communications interface 710 can be, for example, an analog modem, ISDN modem or terminal adapter, cable modem, DSL adapter, token ring IEEE 802.5 interface, Ethernet/IEEE 802.3 interface, wireless 802.11 interface, satellite transmission interface (e.g. "direct PC"), WiMAX/IEEE 802.17 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or any other interface for enabling a processing system to communicate with another processing system.

The processor 708 may be or include, for example, a conventional programmable microprocessor, microcontroller, application-specific integrated circuit (ASIC), programmable logic device (PLD), or the like. The memory 712 is coupled to the processor 708 by an interconnect 720. The memory 712 can be, for example, any form of Random Access Memory (RAM). The interconnect 720 couples the processor 708 to the memory 712, to the non-volatile storage 717, to the display controller 714, and to the I/O controller 718. The interconnect can be, for example, any combination of one or more buses, bridges, controllers and/or adapters.

The I/O devices 704 can include, for example, a keyboard, disk drives, printers, a scanner, and other input and output devices, including a mouse or other pointing device. The display controller 714 may control in the conventional manner a display on the display device 706, which can be, for example, a cathode ray tube (CRT) or liquid crystal display (LCD). The display controller 714 and the I/O controller 718 can be implemented with conventional well known technology.

The non-volatile storage 717 can be, for example, a magnetic hard disk, flash memory, an optical disk, or any other form of storage suitable for persistently storing large amounts of data. One of skill in the art will immediately recognize that the terms "machine-readable medium" or "computer-readable medium" includes any type of storage device that is accessible by the processor 708.

Clock 722 can be any kind of oscillating circuit creating an electrical signal with a precise frequency. In a non-limiting example, clock 722 could be a crystal oscillator using the mechanical resonance of vibrating crystal to generate the electrical signal.

In addition, the system 700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Other examples of operating system software with associated file management system software are the Linux and Unix operating systems and associated file management systems. The file management system is typically stored in the non-volatile storage 717 and causes the processor 708 to execute the various acts required by the operating system to input and output data and to store data in memory, including storing files on the non-volatile storage 717. In addition a storage controller such as described above may include an operating system which is customized to perform network storage-related operations; such operating system may operate on top of a general purpose operating system such as mentioned above or it may be integrated with it.

The present example includes an apparatus for performing the operations described above. Such apparatus may be specially constructed for the required purposes, or it may comprise a general purpose computer selectively activated or configured by a computer program stored in the computer. Such a computer program may be stored in a computer readable storage medium, such as read-only memory (ROM), random access memory (RAM), flash memory, magnetic or optical disks, cards, or any other type of media suitable for storing machine-readable instructions.

What is claimed is:

1. A method of preparing a first network storage controller to create a session with a host for storing and retrieving files using storage managed by the first network storage controller, the method comprising:
   discovering that the first network storage controller has not been prepared to provide storage to the host;
   generating a graphical user interface at a controller management engine to display indicators of one or more network storage controllers that includes an indication that each said network storage controller has not received an initial setup, the graphical user interface to receive user input information for configuration of the first network storage controller, the first network storage controller is in communication with the controller management engine; and
   in response to receiving the information at the graphical user interface, performing the following: automatically configuring the first network storage controller to communicate with the host, provisioning storage managed by the first network storage controller, and mapping the host to the storage managed by the first network storage controller at one or more storage devices.

2. The method of claim 1 further comprising:
   representing a relationship between the host and the first network storage controller as a data structure storing an identifier for the host and one or more identifiers for the storage provisioned, wherein when mapping the storage to the host, the first network storage controller checks the data structure for storage associated with the host and maps the host to storage identified in the data structure.

3. The method of claim 1 wherein, the host is mapped to the first network storage controller using an iSCSI session.

4. The method of claim 1 wherein provisioning storage comprises:
   provisioning an aggregate including one or more non-volatile mass storage devices attached to the first network storage controller;
   provisioning a volume within the aggregate; and
   provisioning a logical unit number (LUN) within the volume.

5. The method of claim 1 further comprising:
   enabling challenge handshake authentication protocol (CHAP) to secure communications between the host and the first network storage controller.

6. The method of claim 1 wherein the controller management engine remotely configures the first network storage controller.

7. The method of claim 1 wherein the controller management engine reports the provisioning and attaching to a user that provided the user input information for configuration of the first network storage controller.

8. The method of claim 1 wherein the first network storage controller has a partner, and the partner controller is identified by the controller management engine searching for the partner controller by name.

9. The method of claim 1 wherein the first network storage controller has a partner, and the partner controller is identified by receiving, at the controller management engine, an address for the partner controller.

10. The method of claim 1 wherein the host is remote to the first network storage controller.

11. The method of claim 1 wherein, automatically configuring the first network storage controller to communicate with the host includes transmitting configuration information to the first network storage controller to configure the first network storage controller.

12. A system for automating network storage setup comprising:
    a first network storage controller having one or more non-volatile mass storage devices attached thereto;
    a storage controller management engine, the storage controller management engine communicating with a host system and with the first network storage controller to provision storage at the first network storage controller and to supply the storage to the host; system, and wherein the storage controller management engine includes a module operable to:
    identify one or more network storage controllers;
    display a list of the one or more controllers at the storage controller management engine;
    receive a selection of a network storage controller in the list, indicating that the first network storage controller should be automatically configured by the storage controller management engine; and
    in response to the selection, transmit configuration information to the first network storage controller to configure the first network storage controller;
    wherein in operation,
    the storage controller management engine receives, at the storage controller management engine, the configuration information from a user, the configuration information including data to prepare the first network storage controller for use by a host to provide storage to the host;
    the storage controller management engine supplies the first network storage controller with the received configuration information;
    the storage controller management engine automatically instructs the first network storage controller to provision storage controlled by the first network storage controller at one or more storage devices for use by the host system; and
    the storage controller management engine automatically instructs the host system to access the storage for use as one or more logical units.

13. The system of claim 12 further comprising:
    representing a relationship between the host and the first network storage controller as a data structure storing an identifier for the host and one or more identifiers for the storage provisioned, wherein when mapping the storage to the host, the first network storage controller checks the data structure for storage associated with the host and maps the host to storage identified in the data structure.

14. The system of claim 12 wherein the host system and the first network storage controller establish an iSCSI session and the host system accesses the storage using the iSCSI session.

15. The system of claim 12 wherein the storage controller management engine further comprises a module operable to cause the first network storage controller to:
    provision an aggregate including one or more mass storage devices coupled to the first network storage controller;

provision a volume within the aggregate; and provision a logical unit number (LUN) for the volume.

16. The system of claim 12 wherein the storage controller management engine further comprises a module operable to:
select the host system requiring one or more virtual storage devices to use as storage;
add the host to a data structure storing an identifier for the host system and one or more identifiers for storage for association with storage;
map one or more LUNs from the first network storage controller to the data structure for association with the host system; and
establish an iSCSI session between the host system and the first network storage controller to create one or more virtual storage devices associated with the one or more LUNs thereby mapping storage to the host.

17. The system of claim 12 wherein the storage device further comprises a module to:
discover a partner controller for the first network storage controller.

18. The system of claim 12 wherein the storage controller management engine is remote to the first network storage controller.

19. A machine readable medium storing instructions which when executed by a machine cause the machine to:
discover a network storage controller that has not been prepared to provide storage to a host;
display a set of indicators, via a user interface of a controller management engine, that includes the network storage controller that has not been prepared to provide storage to the host;
receive, at the controller management engine, a selection from a user indicating the network storage controller should be automatically configured by the storage controller management engine; and
automatically deliver configuration information to the network storage controller;
automatically provision storage managed by the network storage controller; and
automatically map the host to the storage at the network storage controller.

20. A method of automating setup of a network storage controller, the method comprising:
remotely discovering one or more configured network storage controllers including a network storage controller that has not been prepared to provide storage to a host;
displaying, via a user interface of a controller management engine, a list of the one or more controllers, the list including an indication that the network storage controller has not received an initial setup; and
in response to a selection of a network storage controller from the list by a user, remotely providing controller configuration information to the network storage controller in response to the selection of the network storage controller, to set up the network storage controller for providing storage.

21. The method of claim 20 wherein providing controller configuration information includes providing support information for the network storage controller to use to identify servers providing support to the network storage controller.

22. A method performed by a controller management engine, the method comprising:
discovering by the controller management engine connected to one or more network storage controllers via a network, the one or more network storage controllers including a first network storage controller requiring preparation for use, wherein discovering includes scanning the network for available network storage controllers, displaying a list of available network storage controllers to the controller management engine, and receiving a user selection of the first network storage controller at the controller management engine;
setting up the first network storage controller, including receiving configuration information at the controller management engine, delivering the configuration information to the first network storage controller, and initiating network storage services at the first network storage controller;
provisioning storage at the first network storage controller, including creating an aggregate of one or more mass storage devices attached to the first network storage controller, creating a volume within the aggregate and provisioning a LUN within the volume;
discovering one or more hosts on the network including a first host on the network requiring storage, including scanning the network for hosts, displaying a list of hosts to the controller management engine, and receiving, at the controller management engine, a selection of the first host requiring storage; and
mapping storage to the first host, including associating the LUN with a virtual storage device for use by the first host as storage.

23. The method of claim 22 further comprising:
identifying a partner controller for the first network storage controller by searching for the partner by searching for a partner network storage controller having a name stored in the first network storage controller.

* * * * *